US008327577B2

(12) United States Patent
Liang

(10) Patent No.: US 8,327,577 B2
(45) Date of Patent: Dec. 11, 2012

(54) INTELLIGENT PEST KILLING LAMP

(76) Inventor: Chaowei Liang, Shenzhen (CN)

( * ) Notice: Subject to any disclaimer, the term of this patent is extended or adjusted under 35 U.S.C. 154(b) by 377 days.

(21) Appl. No.: 12/548,562

(22) Filed: Aug. 27, 2009

(65) Prior Publication Data

US 2010/0050499 A1    Mar. 4, 2010

(51) Int. Cl.
*A01M 1/08*    (2006.01)
(52) U.S. Cl. .......................................................... 43/113
(58) Field of Classification Search ...................... 43/113; A01M 1/04
See application file for complete search history.

(56) References Cited

U.S. PATENT DOCUMENTS

| | | | | |
|---|---|---|---|---|
| 4,387,529 | A | * | 6/1983 | Hedstrom ......................... 43/112 |
| 5,301,456 | A | * | 4/1994 | Jobin et al. ....................... 43/113 |
| 5,424,551 | A | * | 6/1995 | Callahan .................... 250/493.1 |
| 5,528,049 | A | * | 6/1996 | Callahan .................... 250/493.1 |
| 6,582,253 | B1 | * | 6/2003 | Lau ............................... 439/646 |
| 6,773,104 | B2 | | 8/2004 | Cornelius et al. |
| 7,308,774 | B2 | * | 12/2007 | Lin ................................. 43/113 |
| 7,511,451 | B2 | * | 3/2009 | Pierce ........................... 320/103 |
| 2007/0151141 | A1 | * | 7/2007 | Lin ................................. 43/113 |
| 2009/0045715 | A1 | * | 2/2009 | Shantha et al. ................. 313/51 |

FOREIGN PATENT DOCUMENTS

| | | |
|---|---|---|
| CN | 200620016993.2 | 7/2006 |
| CN | 200620064518.2 | 9/2006 |
| CN | 200720053033.8 | 6/2007 |
| CN | 2008101980389 | 12/2008 |

* cited by examiner

*Primary Examiner* — Christopher P Ellis
(74) *Attorney, Agent, or Firm* — Patent Law Offices of Rick Martin, P.C.

(57) ABSTRACT

The present invention discloses an intelligent pest-killing lamp that attracts, disorients, and ideally kills plant pests, soil insects and sanitary insects, protecting plants and crops. The invention generates light at wavelengths between about 360 nm and about 420 nm with about 365 nm being preferred. The invention can also generates combinations of four colors of light. The light pulses at frequencies ranging from about 250 to about 500 hz, disorienting pests. The invention comprises a screw lamp base, an upper cover, a middle cover, a lamp and a control circuit board. The control circuit board comprises a controller that controls the light pulse frequency and an oscillator that drives the lamp. The screw lamp base is fixed on the upper end of the upper cover, the middle cover is fixed on the lower end of the upper cover, the control circuit board is configured in a space between the upper cover and the middle cover, and two pins on the neck of the lamp run through two holes or hollow cylinders on the lower end of the middle cover with the two pins being attached to the control circuit board.

3 Claims, 4 Drawing Sheets

INTELLIGENT PEST KILLING LAMP

CROSS REFERENCE APPLICATIONS

Pursuant to 35 U.S.C. §119, this application claims priority from and the benefit of Chinese Patent Application No. 2008101980389 titled "Intelligent Pest Killing Lamp" filed on Aug. 27, 2008 with the State Intellectual Property Office of the People's Republic of China. Additionally, this application incorporates by reference, the entire specification and drawings from Chinese Patent Application No. 200620016993.2 titled "Solar Insect Killer" filed on Jul. 18, 2006 with the State Intellectual Property Office of the People's Republic of China and issued as a patent on Aug. 22, 2007 by the State Intellectual Property Office of the People's Republic of China as Patent Number ZL200620016993.2. This application also incorporates by reference, the entire specification and drawings from Chinese Patent Application No. 200620064518.2 titled "Portable Solar Insect Killer" filed on Sep. 20, 2006 with the State Intellectual Property Office of the People's Republic of China and issued as a patent on Mar. 12, 2008 by the State Intellectual Property Office of the People's Republic of China as Patent Number ZL200620064518.2.

FIELD OF INVENTION

The present invention relates to an intelligent pest-killing lamp, in particular to a pest-killing lamp that employs a special combination of wavelengths, oscillation frequencies and wave amplitudes to disorient and ultimately kill pests.

BACKGROUND OF THE INVENTION

In the field of agricultural pest control, pest control chemicals have gradually been replaced by various pest-killing lamps with novel functions along with the continuing development of electronic and industrial technologies. Among the currently available pest-killing lamps, the varieties of pests that can be trapped are very limited. In particular, the trapping and killing results are not ideal for pests with strong drug resistance and target pests, due to the unreasonable design of light spectra and wavelengths. Since the trapping and killing intensity of currently available pest-killing lamps is not high enough, some pests simply fly around the lamps and then fly away. It is impossible to trap all of the pests into nearby pest collectors.

In light of the above technical drawbacks, the available pest killing lamps in the market are unable to completely trap and kill various plant pests and soil insects at organic agricultural product bases. In some cases, organic agricultural product bases prohibit the use of agricultural chemicals to kill pests. Such prohibitions can extend for example, to product bases of vegetables, rice, apple, orange, tea, coffee, cotton, tobacco, grape, peanut, wheat, soybean, flower, greenhouse, dairy farm, pig farm, private gardens and the like. Chemical trapping and killing of sanitary insects, such as the fly, termite, snail, mosquito, cockroach, and the like, are not ideal either.

SUMMARY OF THE INVENTION

Aiming at the above problems, the primary aspect of the present invention is to provide an intelligent pest-killing lamp suitable for organic agricultural product bases that can be used where the bases prohibit the use of agricultural chemicals to kill pests. The present invention is capable of trapping and ideally killing plant pests, soil insects and sanitary insects without the use of chemicals.

Another aspect of the present invention is to generate light having a wavelength between about 360 and about 420 nanometers ("nm"), with about 365 nm being an optimal wavelength.

Optionally, another aspect of the present invention is to generate light comprising a combination of up to four colors each with wavelengths between about 360 and about 420 nm.

Another aspect of the present invention is that the light waves are emitted at pulse frequencies ranging between about 250 and about 500 hz.

Another aspect of the present invention is that the invention includes a lamp assembly that comprises a screw lamp base, an upper cover, a middle cover, a lamp, a control circuit and an oscillator circuit, wherein the screw lamp base is fixed on the upper end of the upper cover, the middle cover is fixed on the lower end of the upper cover, the control circuit and oscillator circuit are configured on a circuit board in the space between the upper cover and the middle cover, two pins on the neck of the lamp run through holes or hollow cylinders on the lower end of the middle cover and are electrically connected to the oscillator circuit, the lamp can be of E27 screw type, and the diameter of the lamp ranges between about 4 millimeters ("mm") and about 5 mm.

Another aspect of the present invention is that the invention can not only trap and kill various plant pests and insects, but it can also protect natural enemies of the pests, such as the dragonfly, mantis, black dot bee, wasp, honeybee and similar natural enemies, thereby protecting the ecological balance.

Another aspect of the present invention is that the special wavelengths and light colors can facilitate the growth of crops and lead to improved yield rates and survival rates of the crops.

Another aspect of the present invention is that resonance between the light wave frequency and the frequency of the oscillator circuit increases the amplitude of the light waves emitted by the invention, achieving better trapping and killing results on pests.

Other aspects of this invention will appear from the following description and appended claims, reference being made to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE PREFERRED EMBODIMENT

Figure 1:
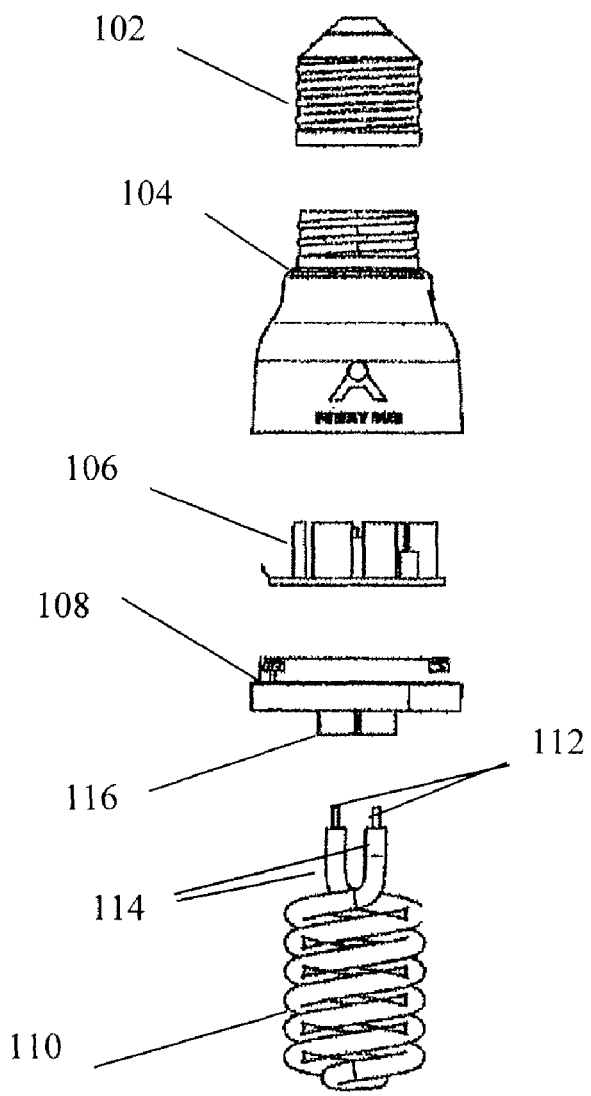
FIG. 1 is a structural schematic diagram of various of the physical components of the lamp assembly in one embodiment of the present invention.

FIG. 1 is a structural schematic of the various physical components of the lamp assembly in one embodiment of the present invention. As shown in FIG. 1, the lamp assembly comprises a screw lamp base 102, an upper cover 104, a middle cover 108, a lamp 110 and a control circuit board 106. The screw lamp base 102 is fixed on the upper end of the upper cover 104. The middle cover 108 is fixed on the lower end of the upper cover 104, and the control circuit board 106 is configured in between the upper cover 104 and the middle cover 108. Two pins 112 on the neck 114 of the lamp 110 run through two holes in hollow cylinders 116 on the end of the middle cover 108 facing the lamp 110. The pins 112 terminate at the control circuit board 106 and are connected to the control circuit board 106 in a manner that enables the flow of electricity, such as by a solder joint. In one embodiment of the present invention, the screw lamp base 102 is an E27 type.

In one embodiment of the invention, the lamp 110 is a florescent lamp that converts electrical power into human-visible light as well as invisible ultraviolet light. Generally, the lamp 110 emits light with wavelengths between about 360 and about 420 nm. In another embodiment of the invention, the lamp 110 is designed with different phosphorescent powders that can simultaneously create up to four different wavelengths of light. In yet other embodiments of the invention, the lamp 110 can comprise one or more filaments that emit light, or can comprise light-emitting diode ("LED") technology. In another embodiment of the invention, the lamp 110 accepts a current of about 12 volts. In various embodiments of the invention, the lamp 110 can output between about 2 watts and about 40 watts of power. In another embodiment of the present invention, the lamp 110 is of screw type or spiral type, and the diameter of the lamp is between about 4 and about 5 mm.

Figure 2:
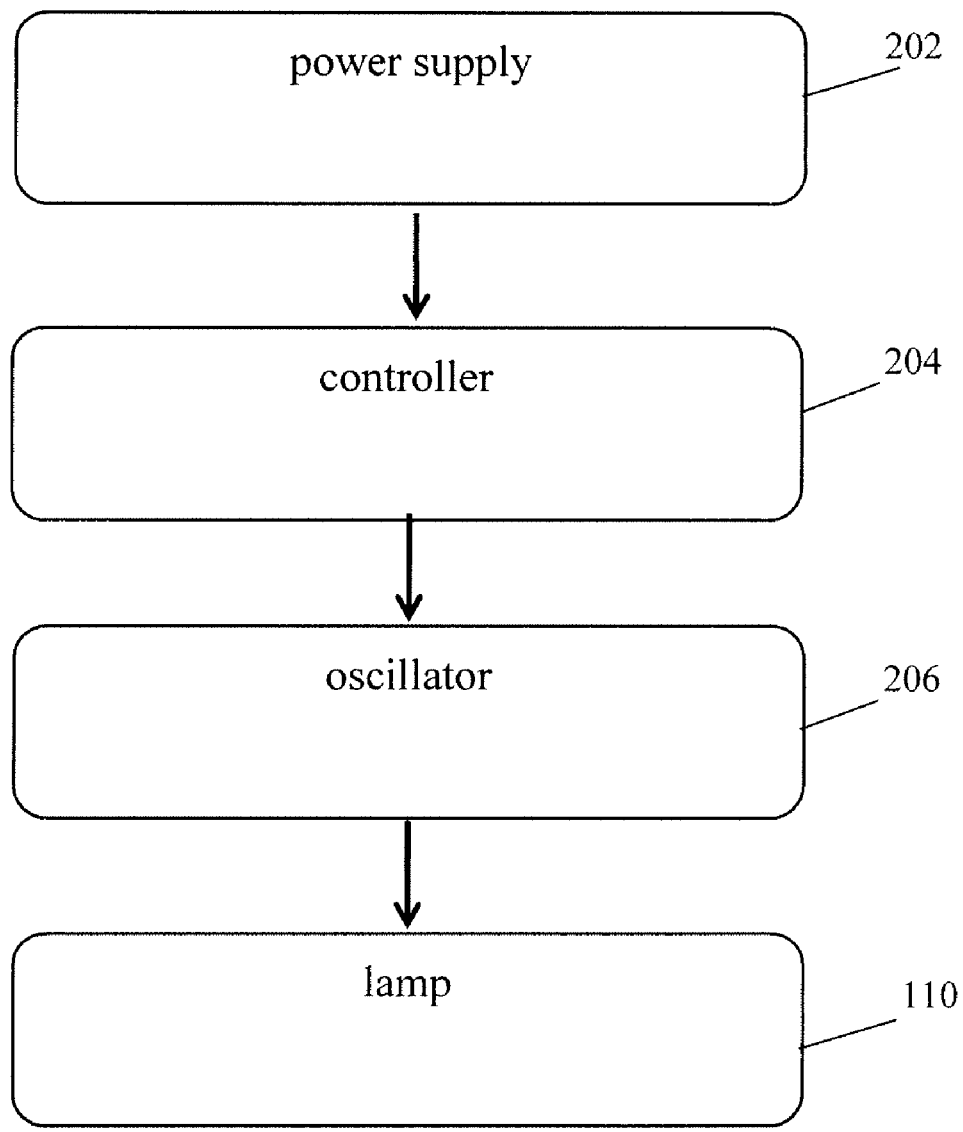
FIG. 2 is a schematic diagram of the major electrical control components of the Intelligent Pest-Killing Lamp in one embodiment of the present invention.

FIG. 2 is a schematic diagram of the major electrical control components of the Intelligent Pest-Killing Lamp from the power supply 202 to the lamp 110 in one embodiment of the present invention. As shown in FIG. 2, in one embodiment of the invention, electrical flow runs from the power supply 202 to the controller 204, to the oscillator 206, and then to drive the lamp 110.

The power supply 202 can comprise any number of varieties generally known by those of skill in the art. For example, in one embodiment of the invention, the power supply 202 can be a DC power supply with current ranging between about 6 volts and about 12 volts. Standard solar panels or batteries are capable of acting as DC power supplies to the invention. In another embodiment of the invention, the power supply 202 can be a solar panel operating at 15 volts with a peak power output of 12 watts. In another embodiment of the invention, the power supply 202 can be a 12 volt DC battery with a capacity of 12 amp-hours. In another embodiment of the invention, the power supply 202 can be a standard AC power source, coupled with an AC/DC power converter that converts the power into a type and level that can be used by the controller 204. In yet another embodiment of the invention, the power supply 202 can be a programmable power supply or can involve a DC/DC transformer.

The controller 204 controls the frequency of the electrical pulses fed to the oscillator 206, which in turn, drives the lamp 110. By controlling the electrical pulse frequency, the controller 204 ultimately controls the brightness of the light emitted by the lamp 110. In one embodiment of the invention, the controller 204 turns the oscillator 206 on and off at a frequency between about 250 and about 500 hz.

The oscillator 206 converts electrical pulses received from the controller 204 into sine waves capable of driving the lamp 110. Thus, in combination, the controller 204 and oscillator 206 accept DC power from the power supply 202 and drive the lamp 110 at pulse frequencies between about 250 hz and about 500 hz. In combination, the controller 204, oscillator 206 and connecting circuitry between them (shown in FIG. 3) comprise the control circuit board 106 of FIG. 1.

Figure 3:
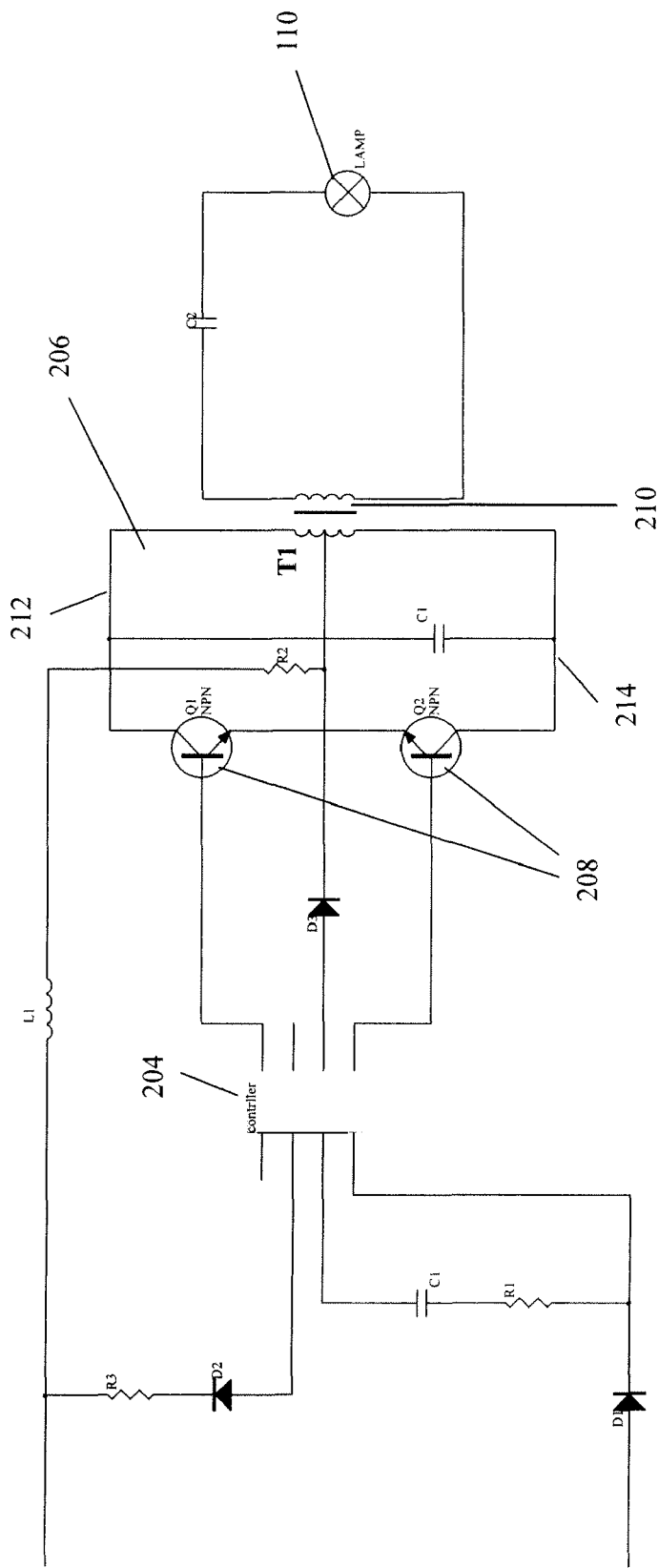
FIG. 3 is a schematic circuit diagram showing control of the flow of electricity through the Intelligent Pest-Killing Lamp in one embodiment of the present invention.

FIG. 3 is a schematic circuit design diagram of the control circuit board 106 in one embodiment of the present invention. The controller 204 is depicted as the square box toward the middle of the diagram. The oscillator 206 is shown in greater detail, and comprises the square section of the diagram bounded by the two transistors 208 on the left, the transformer 210 on the right, and the horizontal lines above 212 and below 214 the transistors 208, with the horizontal lines being to the right of the transistors 208. In one embodiment of the invention, the oscillator circuit comprises a Royer Oscillator, which is known to persons of skill in the art.

Figure 4:
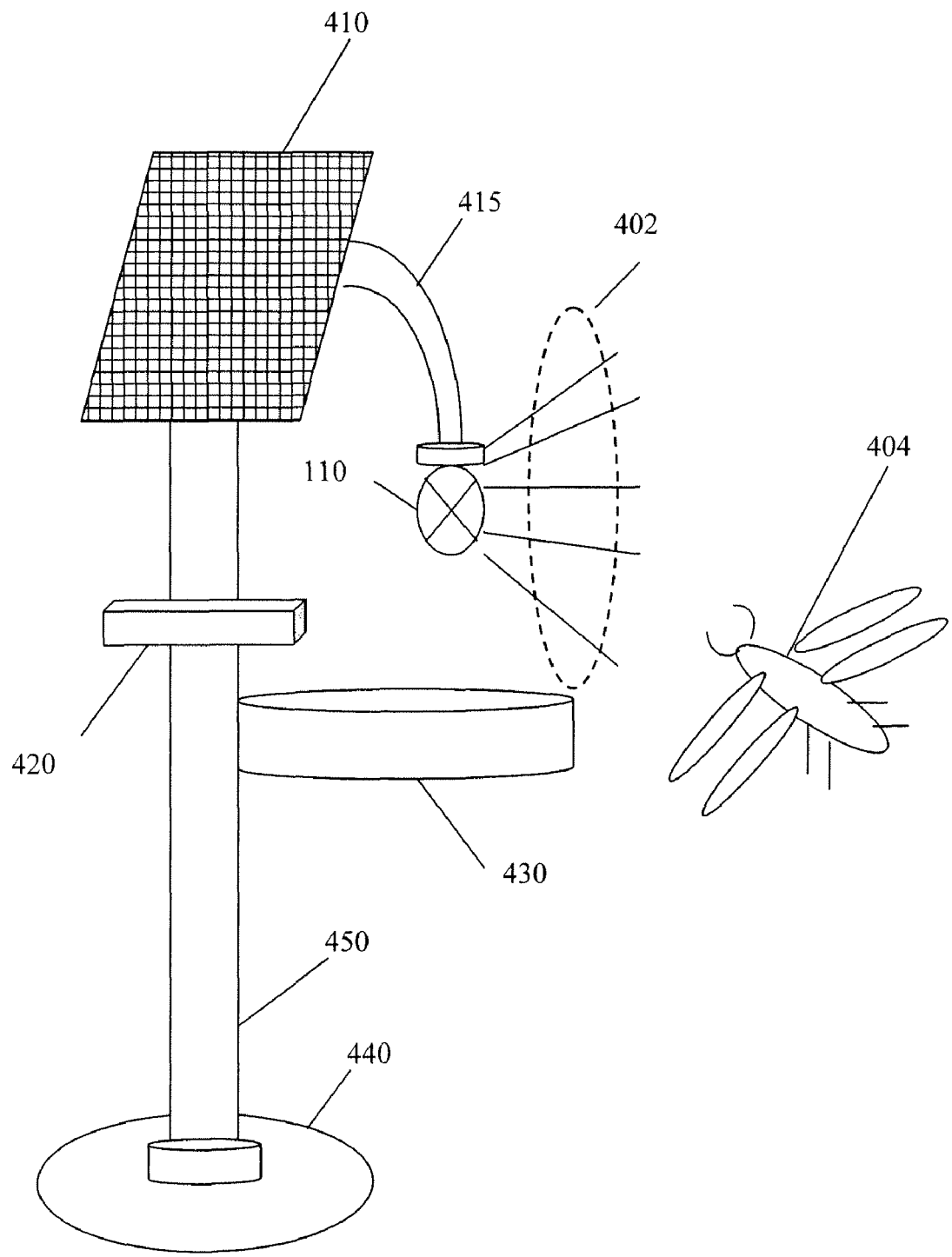
FIG. 4 is a diagram depicting an example of the physical environment in which the Intelligent Pest-Killing Lamp functions to attract, disorient and kill pests in one embodiment of the present invention.

FIG. 4 is a diagram depicting the manner in which the Intelligent Pest-Killing Lamp functions to trap and disorient pests 404 in one embodiment of the present invention. In this embodiment of the invention, a solar panel 410 comprises the power supply 202. The solar panel 410 is attached to a stem 450 adjustable in height, the bottom of which is attached to a base 440 providing stability to the entire assembly. In this embodiment, a control box 420 is also attached to the stem 450. In one embodiment of the invention, the control box 420 comprises water-tight housing that encases controls that control a microprocessor that influences the electrical signal sent from the solar panel 410 to the control circuit board 106 (not shown but would be above the lamp 110). The control box 420 might, for example, enable an operator of the invention to set parameters of operation of the Intelligent Pest-Killing Lamp, such as times of operation, colors and light pulse frequencies.

A curved bracket 415 extends from the top or near the top of the stem 450. The curved bracket 415 curves approximately 180 degrees and the lamp assembly of FIG. 1 is attached to the end of the curved bracket 415 opposite the stem 450. As in FIG. 1, the lamp 110 is at the bottom of the lamp assembly (not shown).

The stem 450 is adjustable in order to allow the height of the solar panel 410 to gain maximum exposure to the sun and the lamp 110 to be set at a height for maximum visibility by pests 404. In one embodiment of the invention, the lamp 110 is positioned approximately 1.2 meters from the ground. The light 402 disbursed from the lamp 110 can cover an area of about 30 acres to about 50 acres under optimal conditions.

The stem 450 also has attached to it underneath the lamp 110, a catch basin 430 that can be filled with water. In one embodiment of the invention, the catch basin 430 is round with a radius of about 550 mm and a depth of about 250 mm. The catch basin 430 collects pests 404 that have been disoriented. Appropriate electrical wiring connects the control box 420 and the solar panel 410 to the control circuit board 106 (not shown in FIG. 4 but above lamp 110 as shown in FIG. 1).

When the Intelligent Pest-Killing Lamp is operating, a pest 404 is attracted to the light 402 emitted by the lamp 110. The pest 404 may include, for example, plant pests, soil insects and sanitary insects. The combination of light 402 wavelength, frequency and amplitude, which can be magnified due to resonance between the frequency of the light pulse 402 and the frequency of the oscillator 206, disorients the pest 404. If the pest 404 is sufficiently disoriented when above catch basin 430, the pest will fall or fly into the catch basin 430 and drown.

The preferred wavelengths of about 360 nm to about 420 nm can be beneficial for the growth of crops, advancing crops' blossoming, fruit bearing, and survival rate. Similarly, the foregoing wavelengths generally do not have the power to trap natural enemies of pests 402, such as honeybees and the like, protecting the ecological balance by improving the ratio of enemies to pests 402.

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:

1. A pest catcher comprising:
   a solar panel providing a source of DC power for a lamp assembly comprising:
   a screw lamp base;
   an upper cover fixed to the screw lamp base;
   a middle cover fixed to the upper cover;
   a florescent lamp fixed to the middle cover, said florescent lamp comprising powders that when electrically stimulated emit light comprising up to 4 different wavelengths, all of said wavelengths being between about 360 nm and about 420 nm,
   a control circuit board configured in a space between the upper cover and the upper cover and the middle cover, said control circuit board comprising:
   a controller that receives DC power from the solar panel, converts the DC power into electrical pulses at frequencies between about 250 hz and about 500 hz and delivers said electrical pulses to an oscillator; and
   an oscillator that receives said electrical pulses from said controller and converts said electrical pulses into sine waves that drive said florescent lamp; and
   a catch basin located beneath the lamp assembly;
   wherein said pest catcher attracts and then disorients pests, causing said pests to fly into the catch basin or fall into the catch basin.

2. The pest catcher of claim 1 further comprising a setting controller, said setting controller fixing the wavelengths emitted by the florescent lamp, fixing the frequencies of the electrical pulses delivered by the controller, fixing the number of light waves simultaneously generated by the florescent lamp and fixing the times of operation of the lamp assembly.

3. The pest catcher of claim 1, wherein the catch basin further comprises water.

* * * * *